United States Patent [19]
Shibasaki et al.

[11] Patent Number: 6,147,824
[45] Date of Patent: *Nov. 14, 2000

[54] SIGNAL REPRODUCING CIRCUIT FOR MAGNETO-RESISTIVE HEAD INCLUDING CONTROL CIRCUIT FOR REDUCING TRANSIENT PERIOD BETWEEN WRITE PERIOD AND READ PERIOD

[75] Inventors: Hidekazu Shibasaki, Higashine; Hiroaki Ueno, Kawasaki, both of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,649

[22] Filed: Dec. 23, 1996

Related U.S. Application Data

[62] Division of application No. 08/306,210, Sep. 14, 1994, Pat. No. 5,623,378.

[30] Foreign Application Priority Data

Dec. 14, 1993 [JP] Japan ................................. 5-313447

[51] Int. Cl.$^7$ ................................. G11B 5/09; G11B 5/02
[52] U.S. Cl. ................................................. 360/46; 360/67
[58] Field of Search ..................................... 327/172, 173, 327/176, 170; 326/87; 360/46, 67, 68, 41, 74.2, 40, 66; 365/222; 340/825.75

[56] References Cited

U.S. PATENT DOCUMENTS

| | | | |
|---|---|---|---|
| 3,665,485 | 5/1972 | Pear ............................................. | 360/40 |
| 4,597,019 | 6/1986 | Nishimoto et al. ..................... | 360/23 X |
| 5,307,212 | 4/1994 | Tagiri ....................................... | 360/46 X |
| 5,323,278 | 6/1994 | Contreras et al. ........................ | 360/67 |
| 5,416,645 | 5/1995 | Fukuyama ................................ | 360/46 |
| 5,434,717 | 7/1995 | Yoshinaga et al. ...................... | 360/46 |

FOREIGN PATENT DOCUMENTS

| | | |
|---|---|---|
| 595350A2 | 5/1994 | European Pat. Off. . |
| 785404 | 3/1995 | Japan . |
| 7169003 | 4/1995 | Japan . |
| 7169009 | 4/1995 | Japan . |
| 7311902 | 11/1995 | Japan . |

OTHER PUBLICATIONS

IBM Technical Disclosure Bulletin, vol. 33, No. 4, Sep. 1990 "Recovery Circuit for Magneto–Resesistive Head Switching".

*Primary Examiner*—Paul Loomis
*Assistant Examiner*—Regina Y. Neal
*Attorney, Agent, or Firm*—Greer, Burns & Crain, Ltd.

[57] ABSTRACT

A signal reproducing circuit includes first power supply lines having different potentials, a magneto-resistive effect head having one end thereof coupled to the first power supply line, for reproducing data recorded on a magnetic recording medium in a read operation, and a first constant current source coupled between another end of the magneto-resistive effect head and the second power supply line, for supplying the magneto-resistive effect head with a sense current in the read operaion. Also included are first and second transistors having collectors thereof coupled to the first power supply line, respectively, and responsive to voltage signals obtained from the one end and the other end of the magneto-resistive effect head. Second and third constant current sources are coupled between each emitter of the first and the second transistors and the second power supply line, respectively, for supplying the first and the second transistors with a first predetermined constant current, respectively, in the read operation. Fourth and fifth constant current sources are provided between each emitter of the first and the second transistors, respectively, and the second power supply line for increasing the emiter curents of the first and the second transistors to a second predetermined constant current during a predetermined period in a transition from a write state to a read state.

6 Claims, 12 Drawing Sheets

SIGNAL REPRODUCING CIRCUIT FOR MAGNETO-RESISTIVE HEAD INCLUDING CONTROL CIRCUIT FOR REDUCING TRANSIENT PERIOD BETWEEN WRITE PERIOD AND READ PERIOD

This application is a division of Ser. No. 08/306,210 filed Sep. 14, 1994 U.S. Pat. No. 5,623,378.

BACKGROUND OF THE INVENTION

1. Field of the Invention

The present invention relates to a signal reproducing circuit in a magnetic recording and reproducing unit or apparatus. More particularly, it relates to a technique of reproducing data recorded on a magnetic recording medium by means of a reproducing head using an element using the magneto-resistive effect (hereinafter referred to as an MR head).

2. Description of the Related Art

In recent years, a magnetic recording and reproducing apparatus such as a magnetic disk drive unit has been developed to have a high speed operation and a large capacity. With the development, to enable a higher density of recording, an MR head has been used for exclusive use in the reproduction of data, in place of an ordinary inductive thin film magnetic head.

This is because, when an MR head is used for reproduction of data, it is possible to detect a signal magnetic field not depending on a relative speed between the MR head and a magnetic recording medium, and thus it is possible to lower a traveling speed of the magnetic recording medium to thereby heighten the density of recording.

However, use of such an MR head has posed a problem in that an undesirable transient phenomenon occurs due to an interterminal voltage of the MR head in a transition from a write state to a read state.

Note, the problems in the prior art will be explained later in detail in contrast with preferred embodiments of the present invention.

SUMMARY OF THE INVENTION

An object of the present invention is to provide a signal reproducing circuit adapted for an MR head, by which it is possible to reduce a transient idle period from a write state to a read state to thereby prevent an undesirable offset component from overlapping the reproduced signal, and to reduce a loss in the data capacity to a minimum.

The above object is attained by suitably controlling respective ON/OFF timings or respective amounts of current of the sense current to be supplied to the MR head and the constant current to be supplied to the first stage read amplifier, in the transition from the write state to the read state.

Therefore, according to a first aspect of the present invention, there is provided a signal reproducing circuit including: first and second power supply lines having different potentials; a magneto-resistive effect head having one end thereof coupled to the first power supply line, for reproducing data recorded on a magnetic recording medium in a read operation; a first constant current source coupled between another end of the magneto-resistive effect head and the second power supply line, for supplying the magneto-resistive effect head with a sense current in the read operation; first and second transistors having collectors thereof coupled to the first power supply line, respectively, and responsive to voltage signals obtained from one end and another end of the magneto-resistive effect head, respectively; second and third constant current sources coupled between each emitter of the first and second transistors and the second power supply line, respectively, for supplying the first and second transistors with a predetermined constant current, respectively, in the read operation; a capacitor connected between the emitter of the first transistor and the emitter of the second transistor; and a control circuit responsive to a read/write control signal, for controlling ON/OFF timings of the first to third constant current sources, respectively, the control circuit controlling the first constant current source to be turned OFF after controlling the second and third constant current sources to be turned OFF in a transition from a read state to a write state, and the control circuit controlling the second and third constant current sources to be turned ON after controlling the first constant current source to be turned ON in a transition from a write state to a read state.

Also, according to a second aspect of the present invention, there is provided a signal reproducing circuit including: first and second power supply lines having different potentials; a magneto-resistive effect head having one end thereof coupled to the first power supply line, for reproducing data recorded on a magnetic recording medium in a read operation; a first constant current source coupled between another end of the magneto-resistive effect head and the second power supply line, for supplying the magneto-resistive effect head with a sense current in the read operation; first and second transistors having collectors thereof coupled to the first power supply line, respectively, and responsive to voltage signals obtained from one end and another end of the magneto-resistive effect head, respectively; second and third constant current sources coupled between each emitter of the first and second transistors and the second power supply line, respectively, for supplying the first and second transistors with a predetermined constant current, respectively, in the read operation; a capacitor connected between the emitter of the first transistor and the emitter of the second transistor; and a control circuit responsive to a read/write control signal, for controlling emitter currents of the first and second transistors, respectively, the control circuit controlling the respective emitter currents of the first and second transistors to be increased larger than the predetermined constant current during a predetermined period in a transition from a write state to a read state.

Furthermore, according to a third aspect of the present invention, there is provided a signal reproducing circuit including: a plurality of signal reproducing circuit portions provided for a corresponding plurality of magnetic recording media, respectively, each of the plurality of signal reproducing circuit portions including: first and second power supply lines having different potentials; a magneto-resistive effect head having one end thereof coupled to the first power supply line, for reproducing data recorded on a corresponding magnetic recording medium in a read operation; a first constant current source coupled between another end of the magneto-resistive effect head and the second power supply line, for supplying the magneto-resistive effect head with a sense current in the read operation; first and second transistors having collectors thereof coupled to the first power supply line, respectively, and responsive to voltage signals obtained from one end and another end of the magneto-resistive effect head, respectively; and second and third constant current sources coupled between each emitter of the first and second transistors and the second power supply line, respectively, for supplying the first and second transistors with a predetermined constant current, respectively, in the read operation; a capacitor provided commonly for each of the plurality of signal reproducing circuit portions and connected between the emitter of the first transistor and the emitter of the second transistor; and a control means responsive to a read/write control signal and a head selection signal, for controlling ON/OFF timings of the first to third constant current sources in each of the plurality of signal reproducing circuit portions, the control means controlling at least one signal reproducing circuit portion corresponding to non-selected heads to be brought to a read state when a signal reproducing circuit portion corresponding to a selected head is in a write state.

According to the constitution based on the first aspect of the present invention, in a transition from the read state to the write state, the second and third constant current sources are first turned OFF to thereby cut off the current flowing through the first and second transistors, and the first constant current source is then turned OFF to thereby cut off the sense current flowing through the MR head. Accordingly, charges in the capacitor are not lost except for a leak loss, and thus the interterminal voltage of the capacitor is kept substantially constant.

Also, in a transition from the write state to the read state, the first constant current source is first turned ON to thereby supply the MR head with the sense current, and the second and third constant current sources are then turned ON to thereby supply the first and second transistors with the constant current. Accordingly, it is possible to charge the capacitor without lowering the interterminal voltage thereof.

Thus, it is possible to relatively reduce the charging time of the capacitor. As a result, a transient idle period from the write state to the read state becomes shorter, and thus it is possible to prevent an undesirable offset component from overlapping the reproduced signal. Also, by a reduction of the idle period, it is possible to lengthen the period in which data can be read from the magnetic recording medium, and thus to reduce a loss in the data capacity to a minimum.

Also, according to the constitution based on the second aspect of the present invention, each emitter current of the first and second transistors is controlled to be increased larger than the predetermined constant current during the predetermined period in a transition from the write state to the read state. Accordingly, it is possible to quickly charge the capacitor up to a predetermined potential. Thus, since the charging time of the capacitor is relatively reduced, it is possible to realize the like effects as in the first aspect of the present invention.

Also, according to the constitution based on the third aspect of the present invention, the capacitor is provided commonly for each of the plurality of signal reproducing circuit portions and is connected between each emitter of the first and second transistors. Accordingly, by controlling at least one signal reproducing circuit portion corresponding to non-selected heads to be brought to a read state when a signal reproducing circuit portion corresponding to a selected head (e.g., channel A) is in a write state, it is possible to maintain the interterminal voltage of the capacitor without any substantial fluctuation. Therefore, in a transition from the write state of the channel A to the read state thereof, it is not necessary to charge the capacitor. Namely, since the charging of the capacitor is not necessary, it is possible to reduce the transient idle period accordingly. Also, by a reduction of the idle period, it is possible to reduce a loss in the data capacity to a minimum.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

For a better understanding of preferred embodiments of the present invention, the related prior art will be explained with reference to FIGS. 1 and 2.

Figure 1:
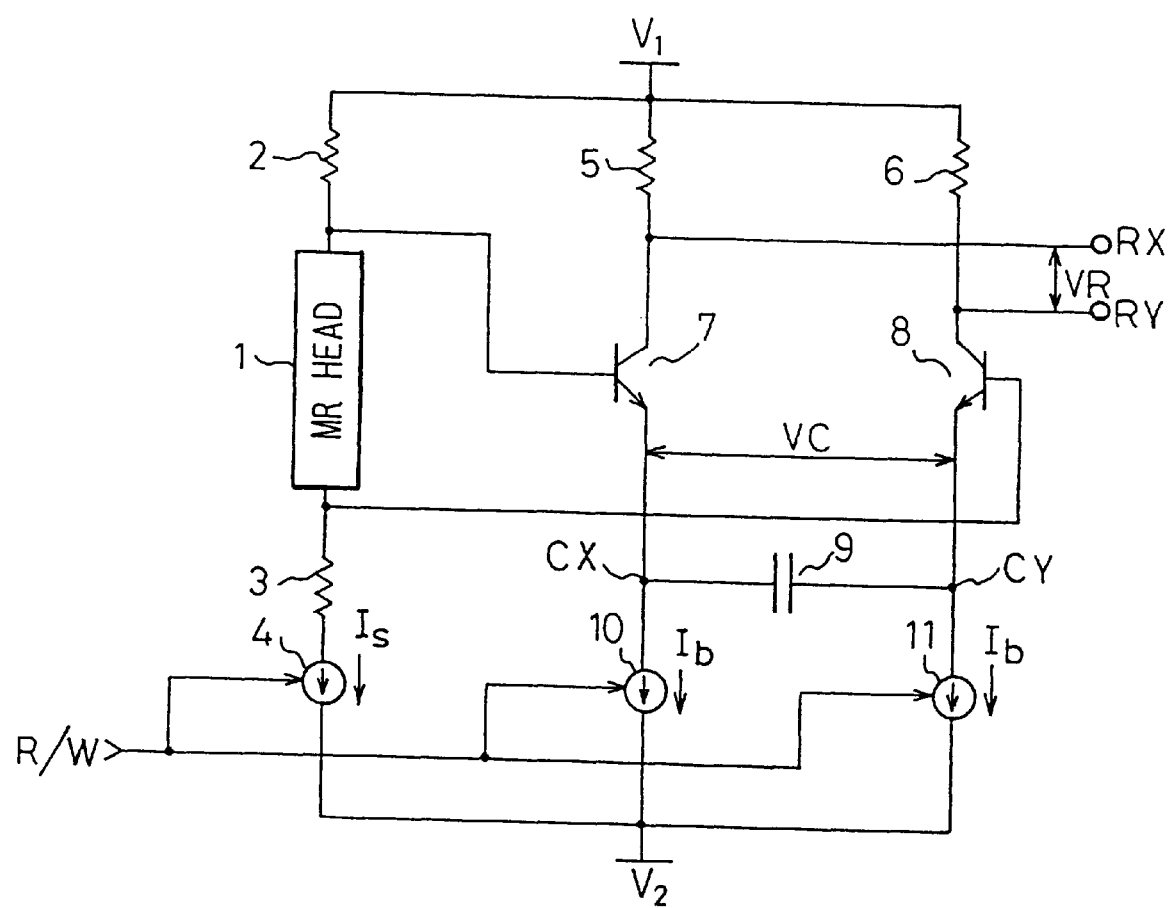
FIG. 1 is a circuit diagram illustrating the constitution of a prior art signal reproducing circuit adapted for an MR head.

FIG. 1 illustrates the circuit constitution of a prior art signal reproducing circuit adapted for an MR head.

In the illustration, one terminal of an MR head 1 is connected via a resistor 2 to a power supply line $V_1$ of a higher potential (e.g., 5 V), and is connected to a base of an NPN transistor 7 constituting a first stage read amplifier. Also, another terminal of the MR head 1 is connected via a resistor 3 and a constant current source 4 to a power supply line $V_2$ of a lower potential (e.g., 0 V), and is connected to a base of an NPN transistor 8 constituting the first stage read amplifier. A collector of the transistor 7 is connected to an output terminal RX, and is connected via a resistor 5 to the power supply line $V_1$. Also, an emitter of the transistor 7 is connected to one terminal CX of a capacitor 9, and is connected via a constant current source 10 to the power supply line $V_2$. On the other hand, a collector of the transistor 8 is connected to an output terminal RY, and is connected via a resistor 6 to the power supply line $V_1$. Also, an emitter of the transistor 8 is connected to another terminal CY of the capacitor 9, and is connected via a constant current source 11 to the power supply line $V_2$. The output terminals RX and RY are connected to a demodulation circuit (not shown).

The constant current sources 4, 10 and 11 are turned ON or OFF in response to a read/write (R/W) control signal, respectively. In the present example, when the R/W control signal is at "H" level, the recording and reproducing apparatus is brought to a read state, and thus the constant current sources 4, 10 and 11 are turned ON to supply constant currents Is, Ib and Ib, respectively. Also, when the R/W control signal is at "L" level, the recording and reproducing apparatus is brought to a write state, and thus the constant current sources 4, 10 and 11 are turned OFF to stop the supply of the respective constant currents.

Accordingly, in the read operation, a first part of a current fed from the power supply line $V_1$ flows through the resistor 2, the MR head 1, the resistor 3 and the constant current source 4 into the power supply line $V_2$; a second part of the current flows through the resistor 5, the transistor 7 and the constant current source 10 into the power supply line $V_2$; and a third part of the current flows through the resistor 6, the transistor 8 and the constant current source 11 into the power supply line $V_2$.

When the current Is, which is a sense current for detecting a magnetic field applied to a magnetic recording medium, flows through the MR head 1, a potential difference occurs between the both terminals of the MR head 1 due to an internal resistance thereof. This results in an occurrence of an offset voltage between the base of the transistor 7 and the base of the transistor 8. Accordingly, the current flowing through the transistor 7 becomes larger than the current flowing through the transistor 8, and thus a potential difference corresponding to the offset voltage occurs between the output terminals RX and RY.

The capacitor 9 functions (i.e., charges or discharges) so as to cancel the potential difference, i.e., the offset voltage. Since an interterminal voltage VC of the capacitor 9 balances each emitter voltage of the transistors 7 and 8, the current of Ib flows through the transistors 7 and 8, respectively.

Thus, a change in voltage caused by a change in the internal resistance of the MR head 1 occurring due to a change in the magnetic field, i.e., a signal whose amplitude is changed according to the change in the magnetic field (i.e., reproduced signal), appears as an output signal VR between the output terminals RX and RY. Ideally, an undesirable offset voltage does not appear between the output terminals RX and RY.

Figure 2:
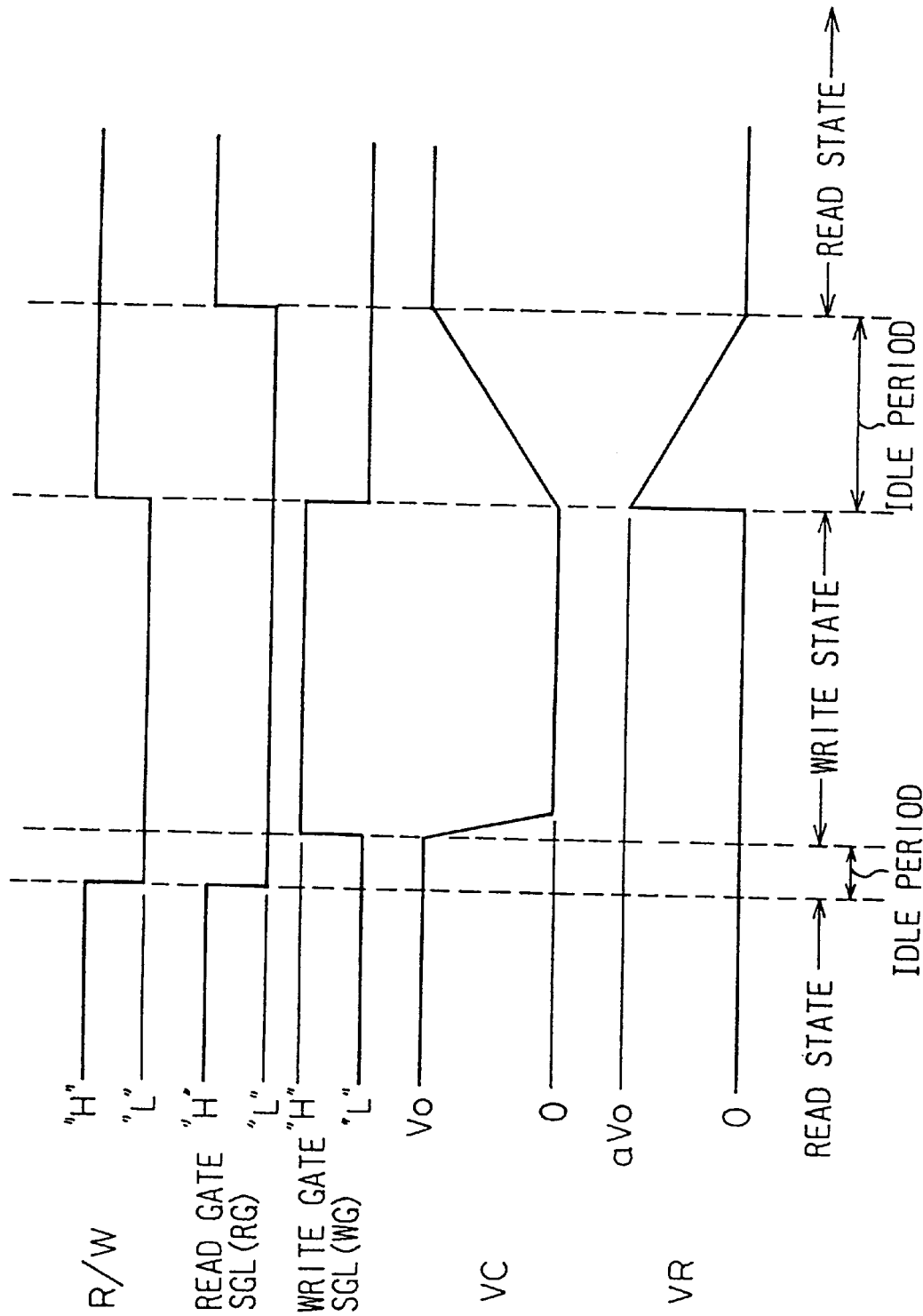
FIG. 2 is a timing chart showing an operation of the circuit of FIG. 1.

FIG. 2 shows an operational timing chart of the circuit of FIG. 1.

In FIG. 2, references RG and WG denote a read gate signal and a write gate signal, respectively. The read gate signal RG is a signal for setting a period in which data can be normally read from the magnetic recording medium, and the write gate signal WG is a signal for setting a period in which data can be normally written into the magnetic recording medium. The read gate signal RG falls when the R/W control signal is changed to "L" level, and it rises when a predetermined idle period elapses after the R/W control signal is changed to "H" level. On the other hand, the write gate signal WG rises when another predetermined idle period elapses after the R/W control signal is changed to "L" level, and it falls when the R/W control signal is changed to "H" level. Namely, the respective idle periods are defined by a period from when the R/W control signal is changed in level until the read gate signal RG (or the write gate signal WG) rises.

As described above, in the read state, it is necessary to apply a bias magnetic field to the magnetic recording medium and thus to cause the sense current Is to flow through the MR head 1. As a result, an offset voltage occurs between the both terminals of the MR head 1. To prevent the offset voltage from being amplified by the first stage read amplifier (transistors 7, 8), the constant current sources 10 and 11 cause the constant current Ib to flow through the transistors 7 and 8, respectively. Thus, a potential difference $V_O$ corresponding to the offset voltage is produced between the terminals CX and CY of the capacitor 9 (see FIG. 2). Namely, the offset voltage appearing between the both terminals of the MR head 1 is canceled by the capacitor 9. As a result, the output signal VR appearing between the output terminals RX and RY presents "0" level (i.e., the offset voltage is zero), and thus no problem occurs.

On the other hand, in the write state, the sense current Is needs to be cut off, so as to prevent a deterioration of the MR element. In this case, no offset voltage occurs between the both terminals of the MR head 1, and thus the interterminal voltage VC of the capacitor 9 presents "0" level. As a result, the output signal VR appearing between the output terminals RX and RY also presents "0" level (i.e., the offset voltage is zero), and thus no problem occurs.

However, a problem occurs in a transition from the write state to the read state (i.e., during a transient period called an idle period in FIG. 2). Namely, during the transient period, charges equivalent to the potential difference $V_O$ corresponding to the offset voltage are accumulated in the capacitor 9. The idle period requires time of approximately 2 or 3 [$\mu s$] according to the time constant. During the idle period, the offset voltage appearing between the both terminals of the MR head 1 is not perfectly canceled by the capacitor 9, and thus a transient influence (voltage $aV_O$) corresponding to the offset voltage appears in the output signal VR. This exerts a bad influence on the signal reproduction, and thus it is preferable to make the transient idle period as short as possible.

Thus, the prior art signal reproducing circuit has posed a problem in that an undesirable offset voltage overlaps the reproduced signal during a transient idle period from a write state to a read state, and thus it is impossible to carry out an accurate demodulation.

Also, during the transient idle period in which the offset voltage occurs, data cannot be read from the magnetic recording medium. Accordingly, a gap portion (portion not carrying data) having a length corresponding to the idle period is formed between adjacent data blocks, and thus the storage capacity of a magnetic disk drive unit becomes relatively decreased. This results in a loss in the data capacity.

Next, the preferred embodiments of the present invention will be explained in detail with reference to FIGS. 3 to 15b.

<First Embodiment (see FIGS. 3 to 8)>

Figure 3:
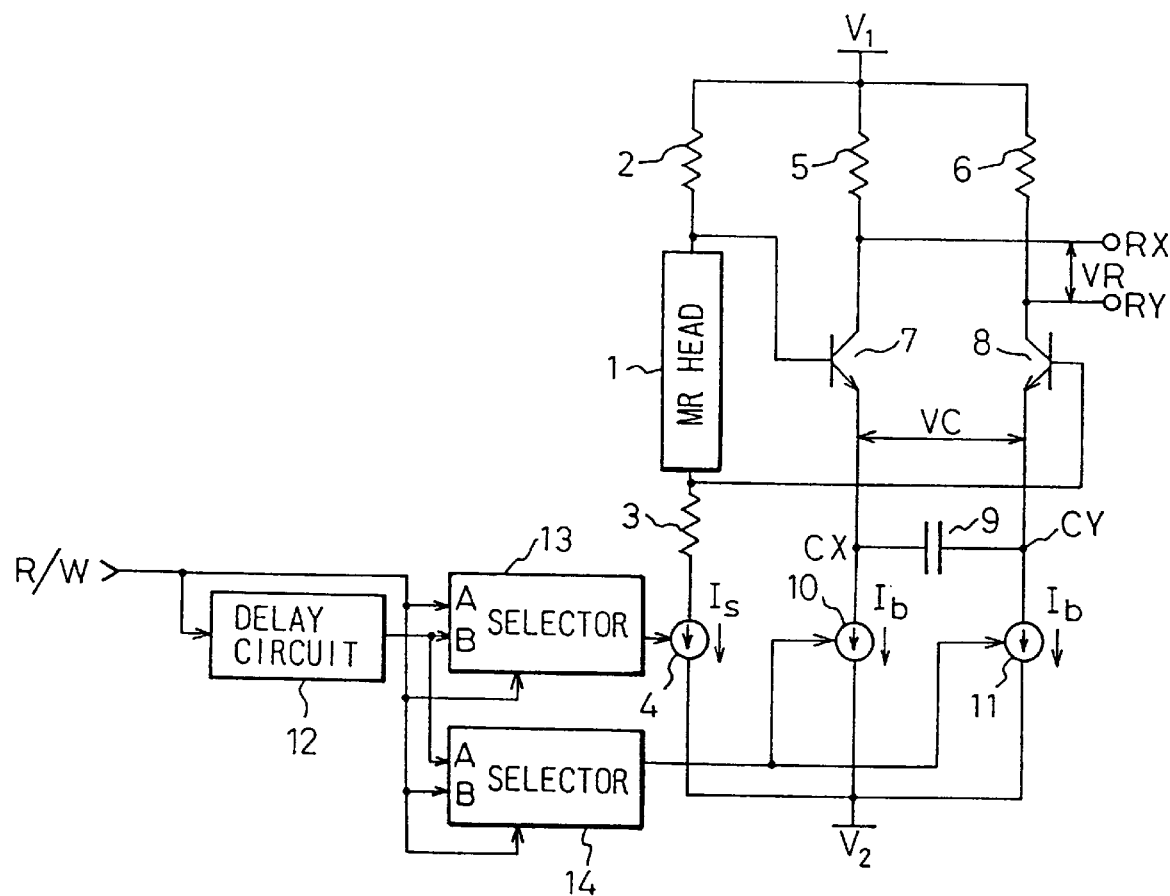
FIG. 3 is a circuit diagram illustrating the constitution of the signal reproducing circuit adapted for an MR head according to a first embodiment of the present invention.

FIG. 3 illustrates the circuit constitution of the signal reproducing circuit adapted for an MR head according to a first embodiment of the present invention.

In the illustration, the same reference marks as those used in FIG. 1 indicate like constituent elements, and thus the explanation thereof is omitted.

The signal reproducing circuit according to the first embodiment is characterized by, in addition to the constitution of FIG. 1, a delay circuit 12 for delaying the R/W control signal by a predetermined time; a selector 13 responsive to the R/W control signal, for selectively outputting the R/W control signal or an output signal (delayed R/W control signal) of the delay circuit 12 to thereby control the constant current source 4 which feeds the sense current Is to the MR head 1; and a selector 14 responsive to the R/W control signal, for selectively outputting the delayed R/W control signal or the R/W control signal to thereby control the constant current sources 10 and 11 which feed the constant current Ib to the transistors 7 and 8, respectively.

In the present embodiment, when the R/W control signal is at "H" level (i.e., in the read state), the selector 13 selects the R/W control signal and the selector 14 selects the delayed R/W control signal. On the other hand, when the R/W control signal is at "L" level (i.e., in the write state), the selector 13 selects the delayed R/W control signal and the selector 14 selects the R/W control signal. Each of the constant current sources 4, 10 and 11 is turned ON when the selected output of the corresponding selector 13, 14 is at "H" level, and thus each constant current source supplies the constant current Is or Ib. Also, each of the constant current sources 4, 10 and 11 is turned OFF when the corresponding selected output is at "L" level, and thus each constant current source stops the supply of the constant current Is or Ib.

Figure 4:
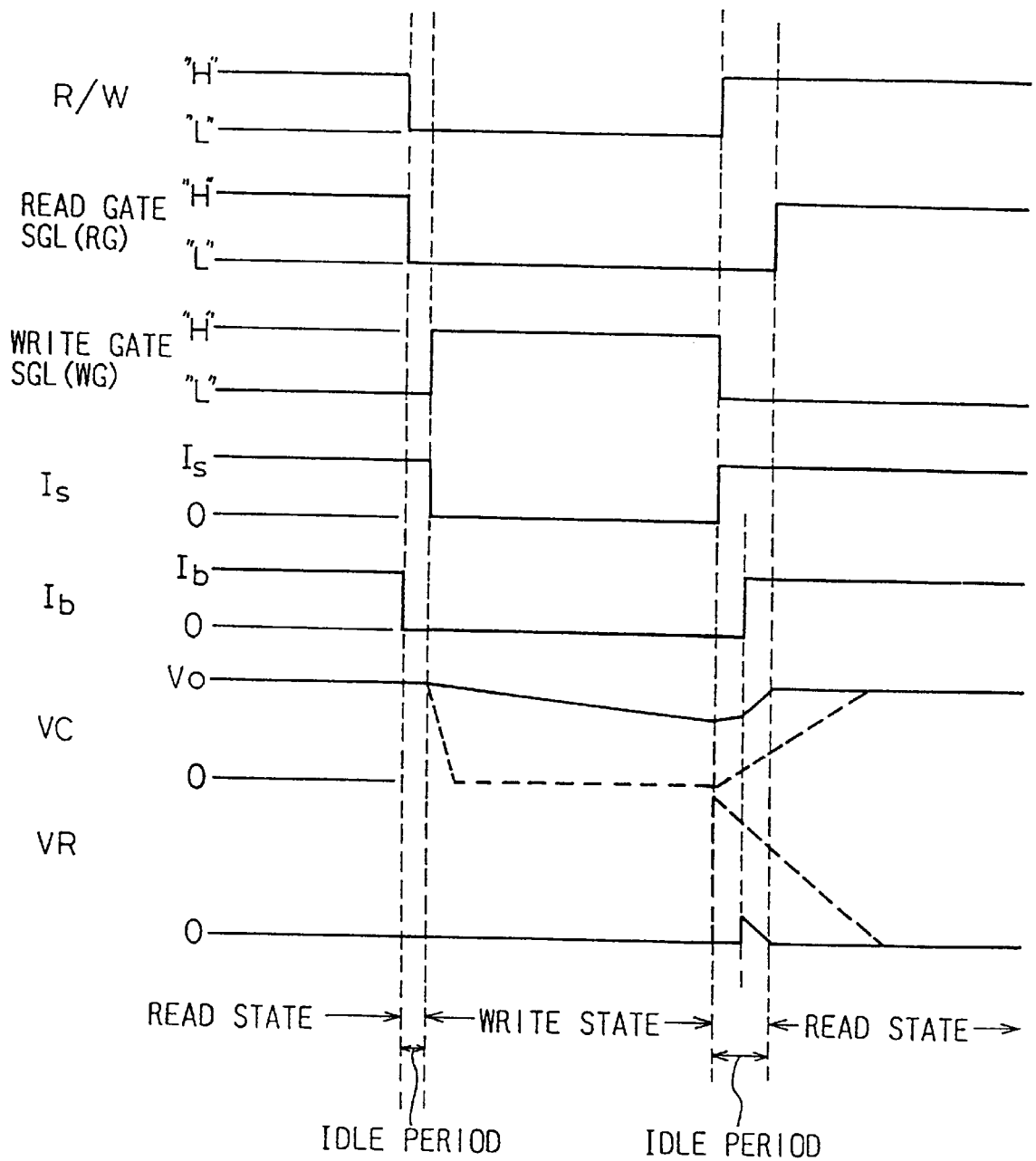
FIG. 4 is a timing chart showing an operation of the circuit of FIG. 3.

FIG. 4 shows an operational timing chart of the circuit of FIG. 3.

When the R/W control signal is changed from "H" level to "L" level (i.e., in a transition from the read state to the write state), the selector 14 first outputs the R/W control signal of "L" level and the selector 13 then outputs the delayed R/W control signal of "L" level. Accordingly, when the R/W control signal is changed to "L" level, the supply of the constant current Ib is stopped, and after a lapse of the predetermined delay time, the supply of the sense current Is is stopped.

On the other hand, when the R/W control signal is changed from "L" level to "H" level (i.e., in a transition from the write state to the read state), the selector 13 first outputs the R/W control signal of "H" level and the selector 14 then outputs the delayed R/W control signal of "H" level. Accordingly, when the R/W control signal is changed to "H" level, the sense current Is is supplied to the MR head 1, and after a lapse of the predetermined delay time, the constant current Ib is supplied to the transistors 7 and 8, respectively.

According to the constitution of the first embodiment (see FIGS. 3 and 4), in a transition from the read state to the write state, the constant current sources 10 and 11 are first turned OFF to thereby cut off the current Ib for the transistors 7 and 8, and the constant current source 4 is then turned OFF to thereby cut off the sense current Is for the MR head 1. Accordingly, charges in the capacitor 9 are not lost except for a leak loss, and thus the interterminal voltage VC of the capacitor 9 is kept substantially constant. In FIG. 4, waveforms indicated by a broken line show waveforms obtained in the prior art (see FIGS. 1 and 2). Also, in a transition from the write state to the read state, the constant current source 4 is first turned ON to thereby supply the MR head 1 with the sense current Is, and the constant current sources 10 and 11 are then turned ON to thereby supply the transistors 7 and 8 with the current Ib. Accordingly, it is possible to charge the capacitor 9 without lowering the interterminal voltage VC thereof.

Thus, it is possible to reduce the charging time of the capacitor 9, compared with the prior art (see waveforms indicated by a broken line). As a result, a transient idle period from the write state to the read state becomes shorter, and thus it is possible to suppress occurrence of a transient phenomenon (undesirable offset voltage) in the idle period. Also, by a reduction of the idle period, it is possible to lengthen the period in which data can be read from the magnetic recording medium, and thus to reduce a loss in the data capacity to a minimum.

Figure 5:
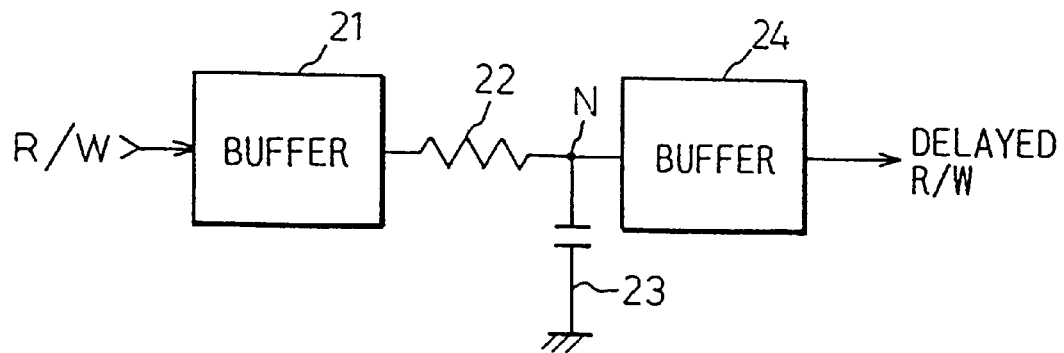
FIG. 5 is a diagram illustrating a constitution of the delay circuit shown in FIG. 3.
Figure 6:
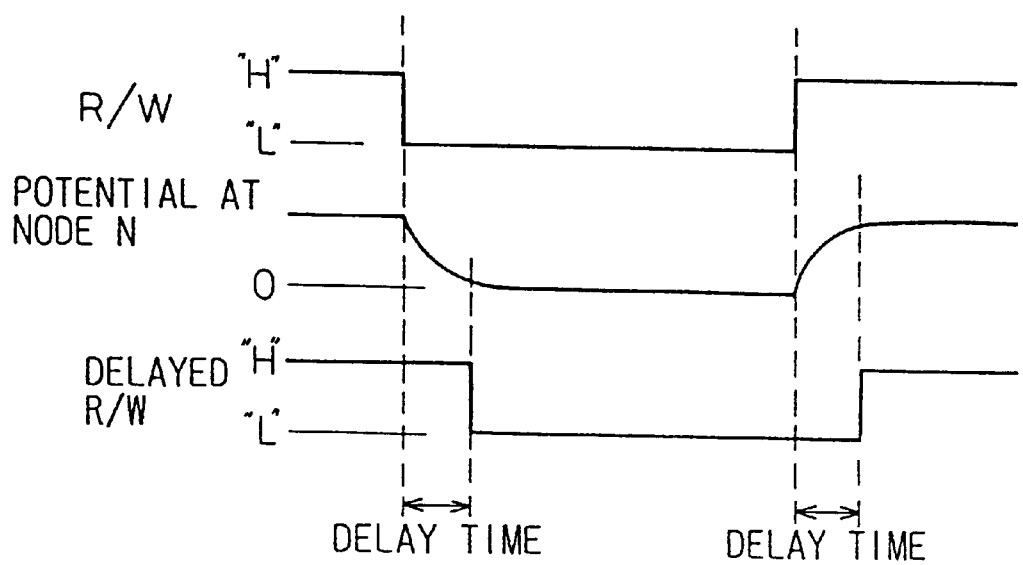
FIG. 6 is a timing chart showing an operation of the circuit of FIG. 5.
Figure 7:
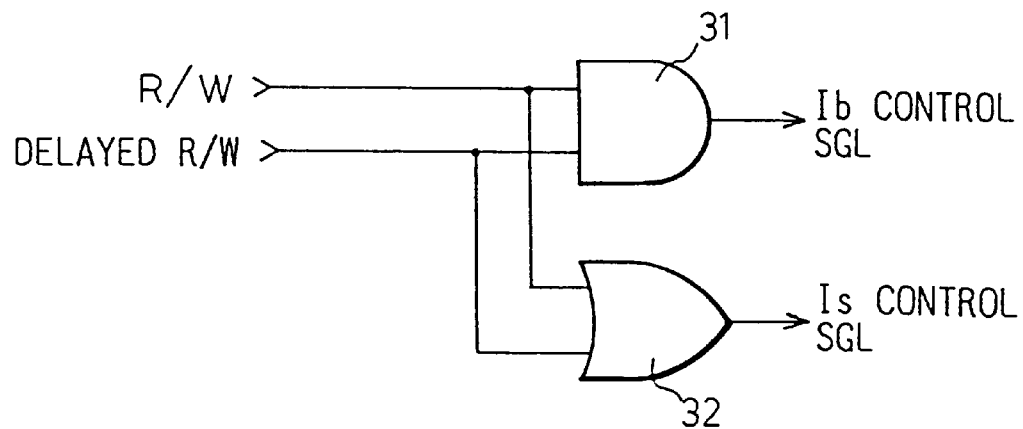
FIG. 7 is a diagram illustrating a constitution of the selector circuit shown in FIG. 3.
Figure 8:
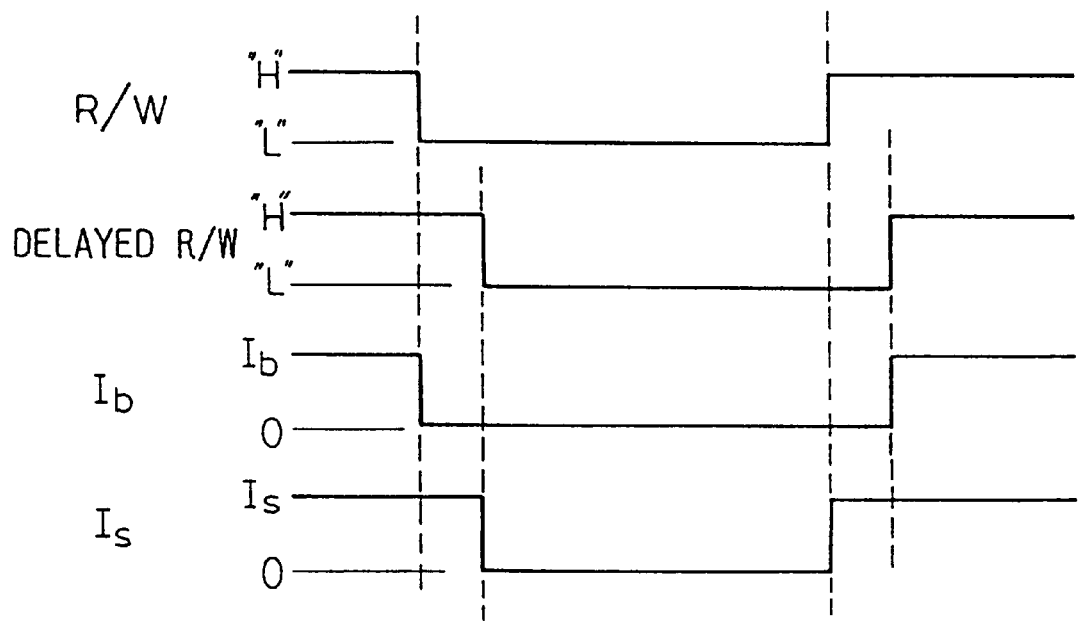
FIG. 8 is a timing chart showing an operation of the circuit of FIG. 7.

FIG. 5 illustrates a constitution of the delay circuit 12, and FIG. 6 shows an operational timing chart thereof. Also, FIG. 7 illustrates a constitution of the selector circuit 13, 14, and FIG. 8 shows an operational timing chart thereof.

First, referring to FIGS. 5 and 6, the R/W control signal is input to a buffer 21, and is then delayed through a CR circuit constituted by a resistor 22 and a capacitor 23. Namely, the CR circuit produces a signal having a transient response characteristic depending on the CR time constant, at node N. The signal at node N is input to a buffer 24 having a threshold level for detecting whether the signal at node N is at "H" level or "L" level. When the signal having the above transient response characteristic is input to the buffer 24, time taken until the voltage value exceeds the threshold level is prolonged.

Thus, the timing of a transition from "H" level to "L" level of the output of the buffer 24, and the timing of a transition from "L" level to "H" level thereof, are delayed compared with the timing of a transition from "H" level to "L" level of the R/W control signal, and the timing of a transition from "L" level to "H" level thereof, respectively.

Although, in the illustrated example, the timing of a change in level of the input R/W control signal is delayed using the CR time constant, it is apparent to those skilled in the art that other delay means can be used if necessary.

Next, referring to FIGS. 7 and 8, the R/W control signal and the delayed R/W control signal obtained through the delay circuit 12 are input to an AND gate 31 and to an OR gate 32. The AND gate 31 outputs a control signal (Ib control signal) for the constant current sources 10 and 11, and the OR gate 32 outputs a control signal (Is control signal) for the constant current source 4.

Although, in the illustrated example, the selectors 13, 14 are constituted using the AND gate 31 and the OR gate 32, it is apparent to those skilled in the art that other selecting means can be used if necessary.

<Second Embodiment (see FIGS. 9 to 12)>

Figure 9:
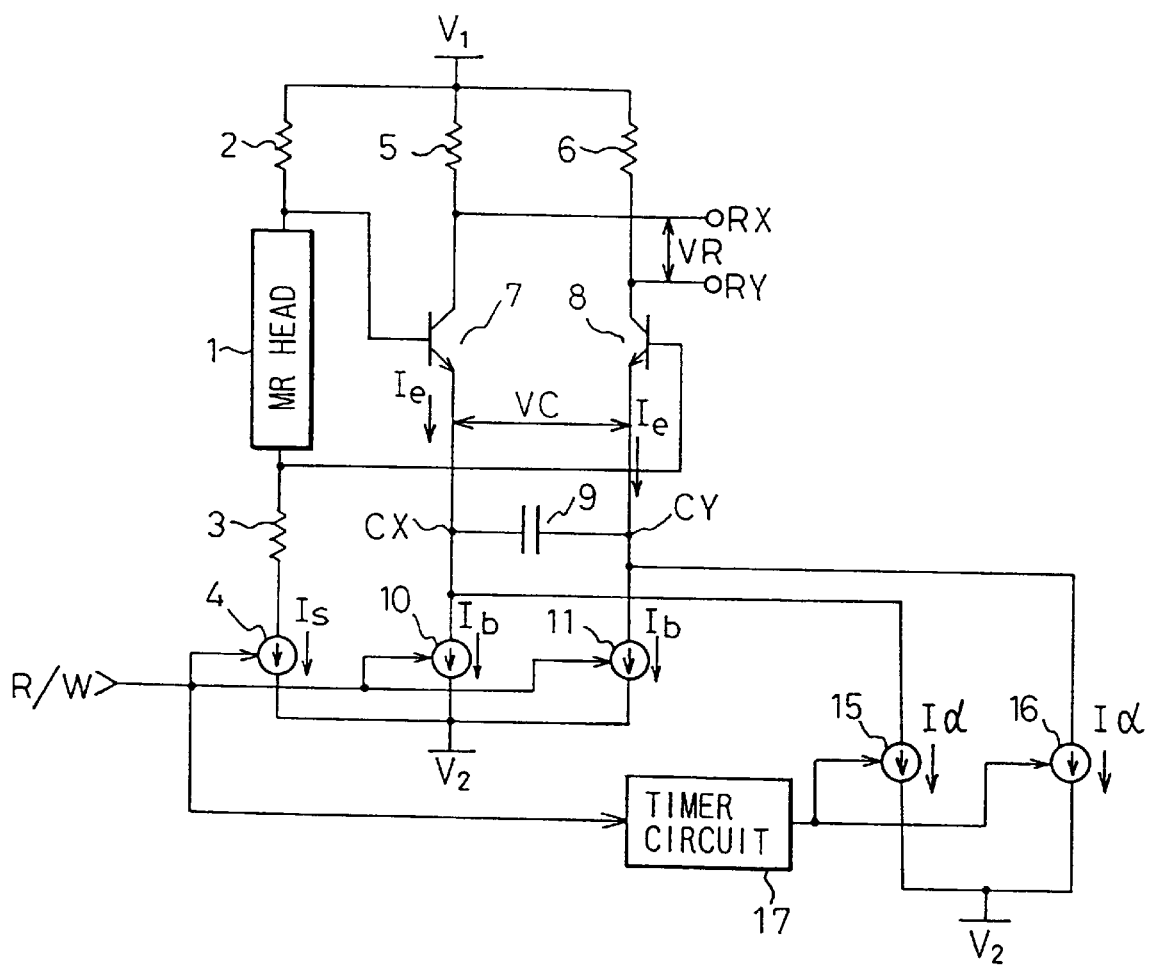
FIG. 9 is a circuit diagram illustrating the constitution of the signal reproducing circuit adapted for an MR head according to a second embodiment of the present invention.

FIG. 9 illustrates the circuit constitution of the signal reproducing circuit adapted for an MR head according to a second embodiment of the present invention.

In the illustration, the same reference marks as those used in FIG. 1 indicate like constituent elements, and thus the explanation thereof is omitted.

The signal reproducing circuit according to the second embodiment is characterized by, in addition to the constitution of FIG. 1, a constant current source 15 connected between the emitter of the transistor 7 and the lower potential power supply line $V_2$, for supplying the transistor 7 with a predetermined constant current $I_\alpha$; a constant current source 16 connected between the emitter of the transistor 8 and the lower potential power supply line $V_2$, for supplying the transistor 8 with a predetermined constant current $I\alpha$; and a timer circuit 17 which starts its operation when the R/W control signal is changed from "L" level to "H" level (i.e., in a transition from a write state to a read state), and which controls the constant current sources 15 and 16 to be brought to an ON state during a predetermined period after the transition from the write state to the read state.

Figure 10:
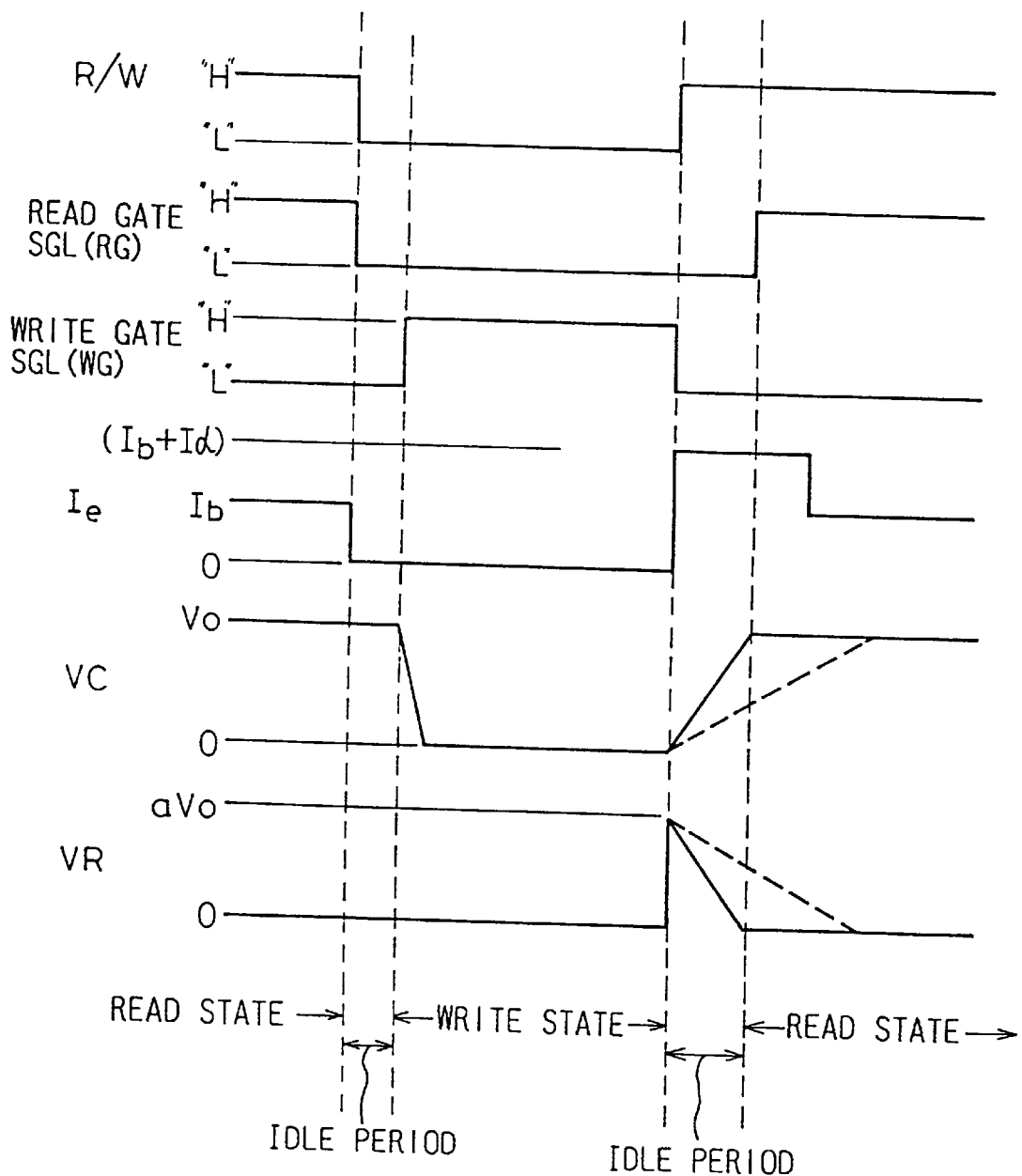
FIG. 10 is a timing chart showing an operation of the circuit of FIG. 9.

FIG. 10 shows an operational timing chart of the circuit of FIG. 9.

Operational waveforms obtained when the R/W control signal is at "H" level (i.e., in the read state), operational waveforms obtained when the R/W control signal is changed from "H" level to "L" level (i.e., in a transition from the read state to the write state), and operational waveforms obtained when the R/W control signal is at "L" level (i.e., in the write state), are the same as those in the prior art (see FIGS. 1 and 2).

When the R/W control signal is changed from "L" level to "H" level (i.e., in a transition from the write state to the read state), the constant current sources 4, 10 and 11 are turned ON to thereby supply the MR head 1, the transistor 7 and the transistor 8 with the constant currents Is, Ib and Ib, respectively. At the same time, the timer circuit 17 starts its operation, and thus the constant current sources 15 and 16 are brought to an ON state during the predetermined period to thereby supply the transistor 7 and the transistor 8 with the constant currents $I_\alpha$ and $I_\alpha$ respectively. Namely, during the predetermined period, each emitter current Ie of the transistors 7 and 8 becomes larger by $I_\alpha$ than the constant current Ib which flows in the read state (Ie=Ib+$I_\alpha$).

Thus, according to the constitution of the second embodiment, each emitter current Ie of the transistors 7 and 8 is controlled to be increased larger than the predetermined constant current Ib during the predetermined period in a transition from the write state to the read state. Accordingly, it is possible to quickly charge the capacitor 9 up to a predetermined potential $V_0$. In FIG. 10, waveforms indicated by broken lines show waveforms obtained in the prior art (see FIG. 2). Thus, since the charging time of the capacitor 9 is relatively reduced, the transient idle period is accordingly reduced, and thus it is possible to suppress influences by a transient phenomenon which may occur in the idle period. Also, by a reduction of the idle period, it is possible to reduce a loss in the data capacity to a minimum.

Figure 11:
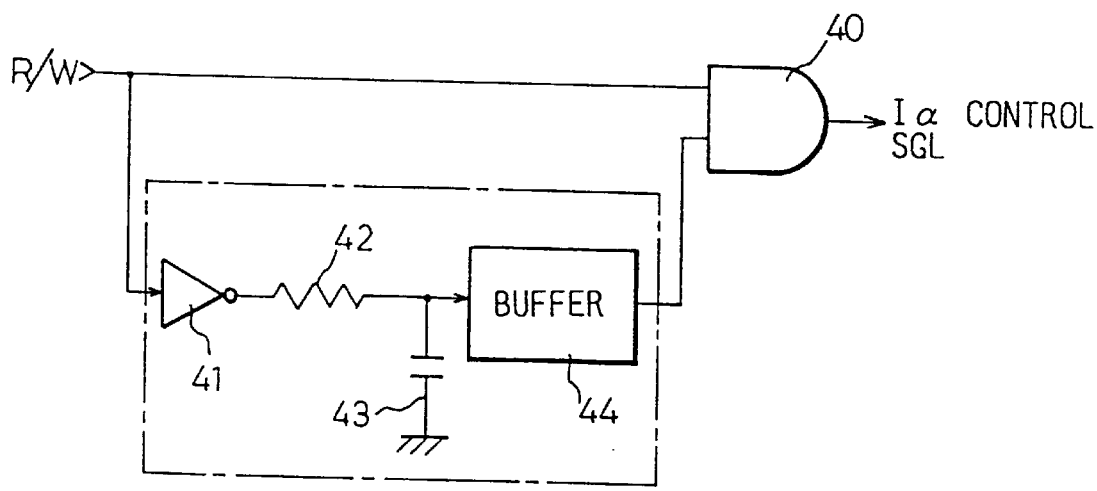
FIG. 11 is a diagram illustrating a constitution of the timer circuit shown in FIG. 9.
Figure 12:
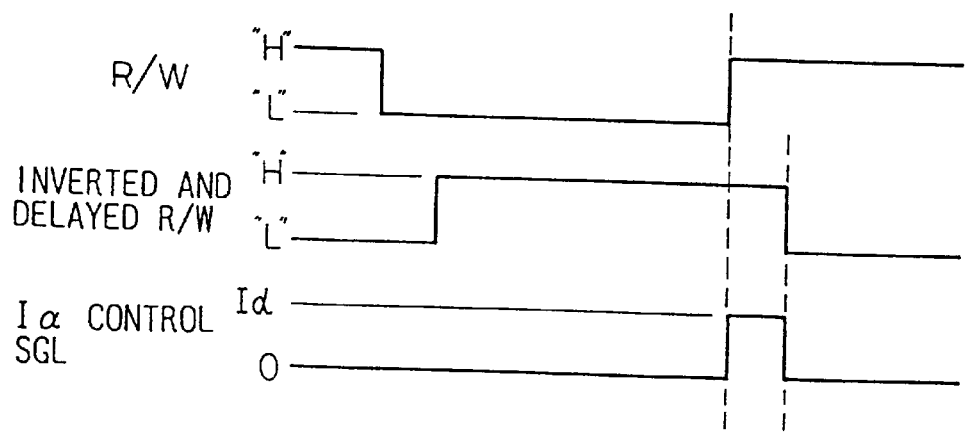
FIG. 12 is a timing chart showing an operation of the circuit of FIG. 11.

FIG. 11 illustrates a constitution of the timer circuit 17, and FIG. 12 shows an operational timing chart thereof.

Referring to FIGS. 11 and 12, the R/W control signal is input to a delay circuit (a portion indicated by a dot and dash line) and to one input end of an AND gate 40. In the delay circuit, the input R/W control signal is inverted by an inverter 41, and the inverted R/W control signal is delayed through a CR circuit constituted by a resistor 42 and a capacitor 43, and through a buffer 44. The inverted and delayed R/W control signal is input to the other input end of the AND gate 40. The AND gate 40 effects an AND operation between the input R/W control signal and the inverted and delayed R/W control signal, and outputs a result of the AND operation as a control signal ($I_\alpha$ control signal) for the constant current sources 15 and 16. Note, the pulse width of the $I_\alpha$ control signal can be adjusted by suitably changing the CR time constant in the delay circuit.

<Third Embodiment (see FIG. 13)>

Figure 13:
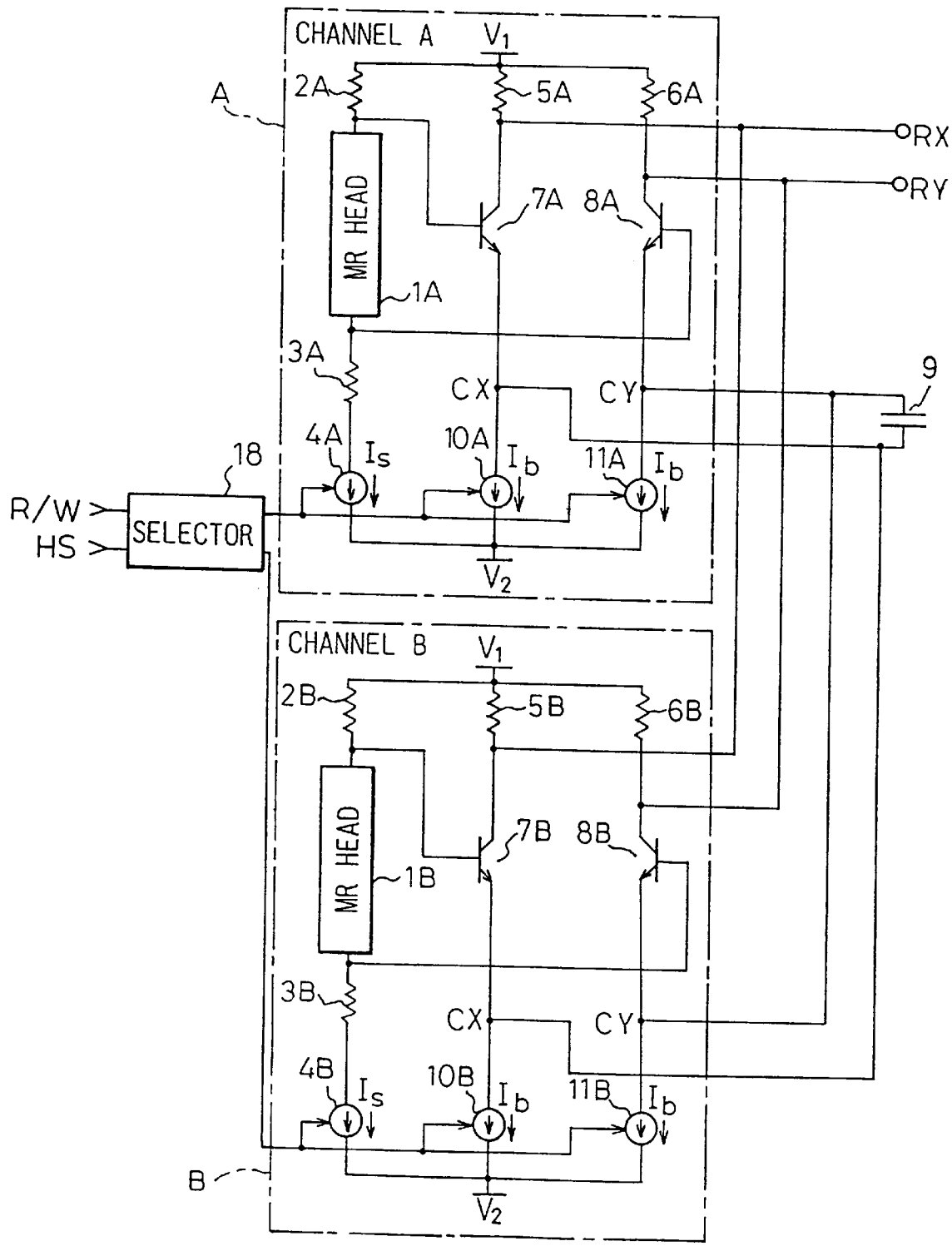
FIG. 13 is a circuit diagram illustrating the constitution of the signal reproducing circuit adapted for an MR head according to a third embodiment of the present invention.

FIG. 13 illustrates the circuit constitution of the signal reproducing circuit adapted for an MR head according to a third embodiment of the present invention.

In the illustration, each portion indicated by references A and B is a signal reproducing circuit portion for an MR head provided for each (channel) of a plurality of magnetic recording media (e.g., magnetic disks). For simplification of the explanation, the present embodiment illustrates two channels A and B. The constitution of the signal reproducing circuit portion for each channel A, B is basically the same as that of the prior art shown in FIG. 1. In the illustration of FIG. 13, the reference mark A or B is appended to each constituent element for each channel A or B.

The signal reproducing circuit according to the present embodiment is characterized in that the capacitor 9 is provided commonly for each channel A, B, between the emitter of the transistor 7 (A, B) and the emitter of the transistor 8 (A, B); that ON/OFF timings of the constant current sources 4 (A, B), 10 (A, B) and 11 (A, B) in each channel A, B are controlled using a selector 18 responsive to the R/W control signal R/W and a head selection signal HS; and that a non-selected channel is controlled to be in the read state when a selected channel is in the write state.

According to the constitution of the third embodiment, when one channel (e.g., channel A) is selected by the head selection signal HS, the selected channel A carries out a read/write operation in response to the R/W control signal R/W. In this case, by supplying the non-selected channel B with the R/W control signal having a logic level opposite to the channel A, it is possible to bring the channel B to the read state (or write state) when the channel A is in the write state (or read state). Therefore, by operating the constant current sources 4B, 10B and 11B in the non-selected channel B when the selected channel A is in the write state (i.e., when the constant current sources 4A, 10A and 11A are OFF), it is possible to maintain the interterminal voltage of the capacitor 9 without any substantial fluctuation.

Therefore, it is not necessary to charge the capacitor 9 in a transition from the write state of the channel A to the read state thereof, and thus it is possible to quickly recover the channel A to its read state. Namely, since the charging of the capacitor 9 is not necessary, it is possible to reduce the transient idle period accordingly. Also, by a reduction of the idle period, it is possible to reduce a loss in the data capacity to a minimum.

Although the third embodiment has been explained by way of the case of two channels (A, B), it is also applicable to the case of multi-channel other than two channels. In this case, by supplying at least one channel other than a selected channel with the R/W control signal having a logic level opposite to the selected channel, it is possible to constantly maintain the interterminal voltage of the capacitor 9.

Figure 14A:
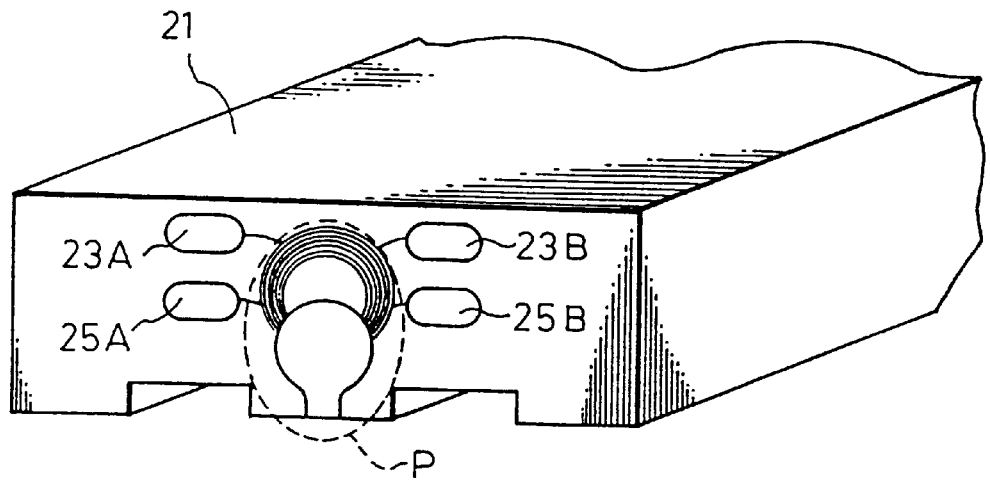
FIGS. 14a and 14b are explanatory views of the MR head used in each embodiment of the present invention.
Figure 14B:
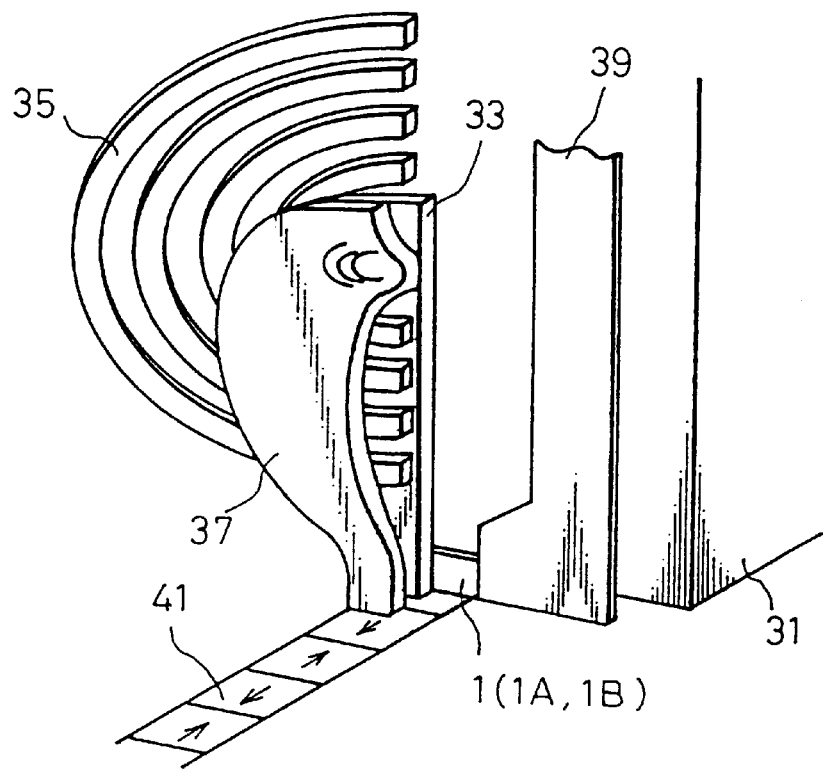

FIG. 14a shows the structure of the entire recording and reproducing head involving the MR head used in each embodiment of the present invention, and FIG. 14b shows the portion indicated by reference P in FIG. 14a, in enlarged view.

In FIG. 14a, reference 21 denotes a slider for the recording and reproducing head. On the end surface of the slider 21, a recording and reproducing magnetic head (the portion indicated by reference P) is formed using vacuum thin film formation technology. As shown in FIG. 14b, the thin film magnetic head involves an MR element 1 (1A, 1B) formed in thin film on a shielding member 31 and functioning as the reproducing head, a recording current supply coil 35 formed in thin film via a shielding thin film 33 on the MR element, and an inductive head 37 functioning as the recording head. Reference 39 denotes a lead for supplying the MR element 1 (1A, 1B) with a sense current, and reference 41 denotes a track on which data are recorded. Also, in FIG. 14a, references 23A and 23B denote pads connected to terminals of the coil 35, respectively, and references 25A and 25B denote pads connected to the leads 39 of the MR element, respectively.

Figure 15A:
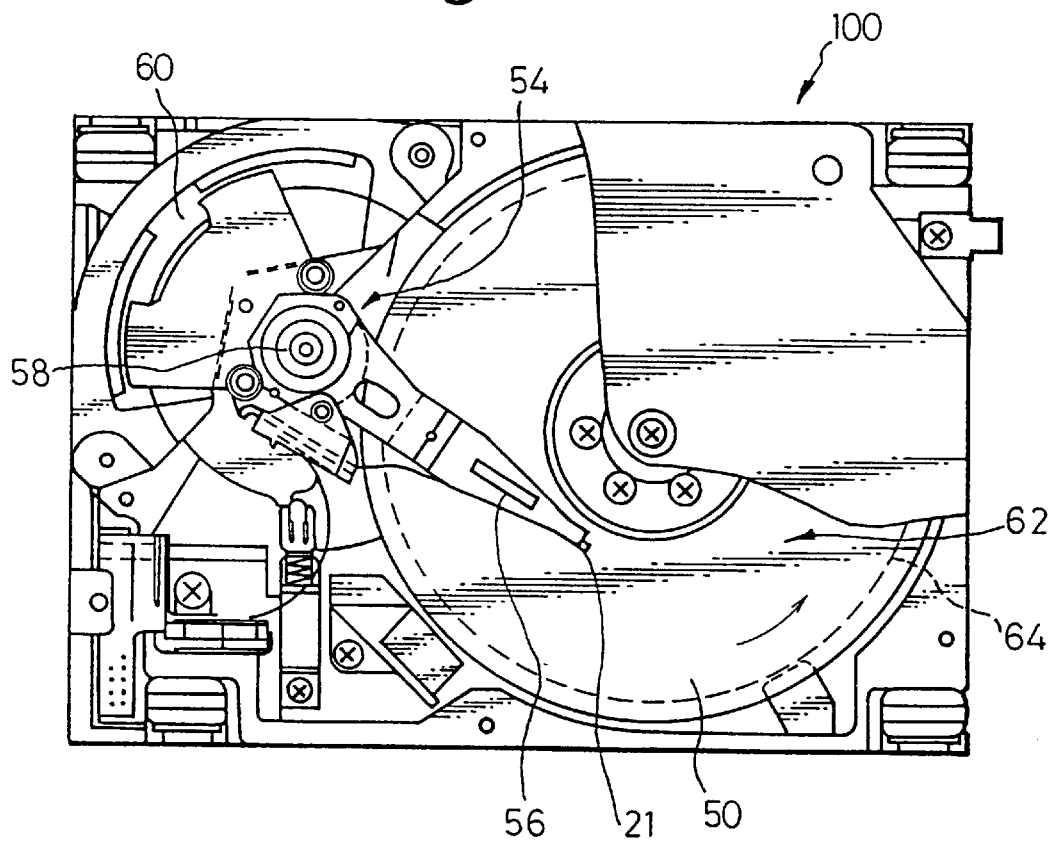
FIGS. 15a and 15b are views illustrating the structure of the magnetic disk drive unit to which each embodiment of the present invention is applied.
Figure 15B:
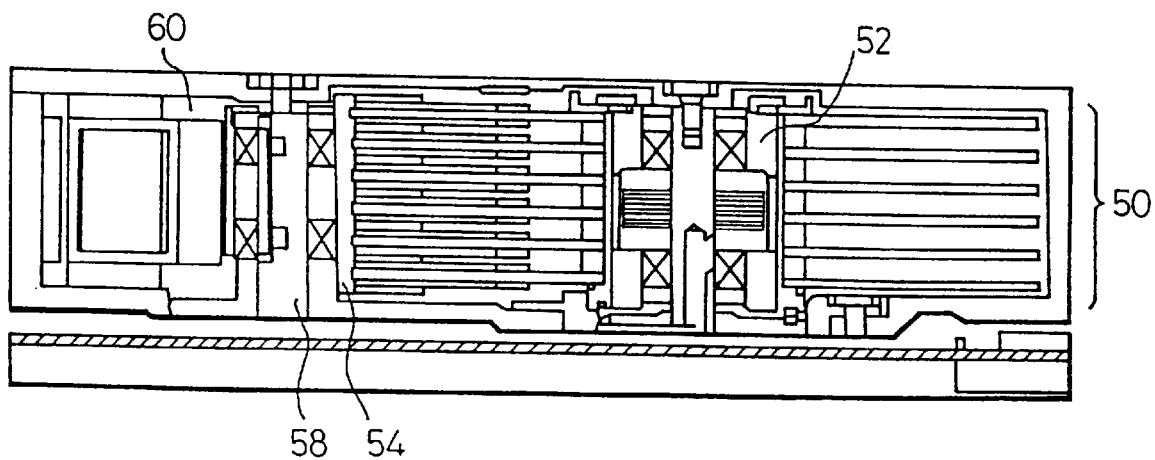

FIGS. 15a and 15b show the structure of the magnetic disk drive unit to which each embodiment of the present invention is applied, in plan view and in sectional view, respectively.

Referring to FIGS. 15a and 15b, magnetic disks 50 are disposed within a disk enclosure 100, and in the illustrated example (see FIG. 15b), six magnetic disks 50 are rotatably provided by a disk rotation unit 52. The slider 21 for the recording and reproducing head is attached to the tip of an arm 56 in a head actuator 54, and is driven by a voice coil motor (VCM) 60, around a shaft 58. Also, a plurality of (e.g., 1000 to 1500) tracks 62 for recording data are formed in the form of concentric circles on the surface of each magnetic disk 50. A portion of the tracks 62 (e.g., an outer circumferential portion) is used for recording servo data, which is indicated as a measuring cylinder 64.

Although the present invention has been disclosed and described by way of three embodiments, it is apparent to those skilled in the art that other embodiments and modifications of the present invention are possible without departing from the essential features thereof.

What is claimed is:

1. A signal reproducing circuit comprising:

first and second power supply lines having different potentials;

a magneto-resistive effect head having one end thereof coupled to the first power supply line, for reproducing data recorded on a magnetic recording medium in a read operation;

a first constant current source coupled between another end of the magneto-resistive effect head and the second power supply line, for supplying the magneto-resistive effect head with a sense current in the read operation;

first and second transistors having collectors thereof coupled to the first power supply line, respectively, and responsive to voltage signals obtained from the one end and the another end of the magnetoresistive effect head, respectively;

second and third constant current sources coupled between each emitter of the first and the second transistors and the second power supply line, respectively, for supplying the first and the second transistors with a first predetermined constant current, respectively, in the read operation;

a capacitor connected between the emitter of the first transistor and the emitter of the second transistor;

fourth and fifth constant current sources between each emitter of the first and the second transistors respectively and the second power supply line for increasing the emitter currents of the first and the second transistors to a second predetermined constant current during a predetermined period in a transition from a write state to a read state; and a timer circuit which starts its operation when a read/write control signal is changed in level in the transition from the write state to the read state and which controls the fourth and the fifth constant current sources to be brought to an ON state during the predetermined period.

2. The signal reproducing circuit according to claim 1, wherein said timer circuit comprises a delay circuit responsive to said read/write control signal, and a logic gate responsive to an output signal of the delay circuit and said read/write control signal, the logic gate outputting a control signal for the fourth and the fifth constant current sources.

3. The signal reproducing circuit according to claim 2, wherein said delay circuit includes an inverter responsive to said read/write control signal, and a CR circuit constituted by a resistor and a capacitor and responsive to an output of the inverter.

4. The signal reproducing circuit according to claim 1, further comprising a resistor connected between the first power supply line and one end of said magneto-resistive effect head, a resistor connected between the first constant current source and the another end of the magneto-resistive effect head, a resistor connected between the first power supply line and the collector of the first transistor, and a resistor connected between the first power supply line and the collector of the second transistor.

5. A method for reducing an idle period between a write state and a read state in a signal reproducing circuit having a magneto-resistive head, the method comprising the steps of:

increasing a current flow through a read amplifier of the signal reproducing circuit from a first predetermined level to a second predetermined level higher than the first predetermined level; and timing the increase in the current flow through the read amplifier so that the increase in the current flow occurs during the idle period between the write state to the read state; and decreasing the current flow to a third predetermined level between the first predetermined level and the second predetermined level after the idle period.

6. The method according to claim 5 wherein the read amplifier includes a pair of transistors and the increase in the current flow occurs with respect to emitter current of the pair of transistors.

\* \* \* \* \*

UNITED STATES PATENT AND TRADEMARK OFFICE
CERTIFICATE OF CORRECTION

PATENT NO. : 6,147,824
DATED : November 14, 2000
INVENTOR(S) : Shibasaki et al.

It is certified that error appears in the above-identified patent and that said Letters Patent is hereby corrected as shown below:

Title page,
Item [57], ABSTRACT,
Line 1, after "first" insert -- and second --.
Line 21, delete "emiter currents" and insert -- emitter currents --.

Claim 1,
Lines 26-27, delete "transistors respectively and" and insert -- transistors respectively, and --.
Line 34, delete "state and" insert -- state, and --.

Signed and Sealed this

Eleventh Day of December, 2001

Attest:

NICHOLAS P. GODICI
*Attesting Officer*    *Acting Director of the United States Patent and Trademark Office*